(12) United States Patent
Ichikawa

(10) Patent No.: US 7,071,245 B2
(45) Date of Patent: Jul. 4, 2006

(54) OIL-BASED BALLPOINT PEN INK COMPOSITION AND OIL-BASED BALLPOINT PEN

(75) Inventor: Shuji Ichikawa, Tokyo (JP)

(73) Assignee: Mitsubishi Pencil Co., Ltd., Tokyo (JP)

(*) Notice: Subject to any disclaimer, the term of this patent is extended or adjusted under 35 U.S.C. 154(b) by 337 days.

(21) Appl. No.: 09/979,884

(22) PCT Filed: Apr. 3, 2001

(86) PCT No.: PCT/JP01/02904

§ 371 (c)(1),
(2), (4) Date: Nov. 27, 2001

(87) PCT Pub. No.: WO01/74956

PCT Pub. Date: Oct. 11, 2001

(65) Prior Publication Data

US 2003/0045607 A1   Mar. 6, 2003

(30) Foreign Application Priority Data

Apr. 3, 2000 (JP) ............... 2000-105414
Jul. 31, 2000 (JP) ............... 2000-232004

(51) Int. Cl.
C09D 11/18 (2006.01)
B05C 21/00 (2006.01)
C08K 5/05 (2006.01)

(52) U.S. Cl. .................. 523/161; 401/209; 524/379

(58) Field of Classification Search ............... 523/160, 523/161; 524/548, 549, 379, 386, 385; 106/31.57, 106/31.85, 31.86; 401/208, 209
See application file for complete search history.

(56) References Cited

U.S. PATENT DOCUMENTS

| | | | | |
|---|---|---|---|---|
| 4,077,807 A * | 3/1978 | Kramer et al. | ........... | 106/31.28 |
| 4,650,494 A * | 3/1987 | Kutsukake et al. | ........... | 8/471 |
| 5,769,931 A * | 6/1998 | Wang et al. | ........... | 106/31.38 |
| 5,980,624 A * | 11/1999 | Ichikawa | ........... | 106/31.58 |
| 6,048,914 A * | 4/2000 | Goto et al. | ........... | 523/161 |
| 6,441,061 B1 * | 8/2002 | Ikai | ........... | 523/160 |
| 6,454,481 B1 * | 9/2002 | Izumi | ........... | 401/142 |
| 6,479,568 B1 * | 11/2002 | Fujii et al. | ........... | 523/161 |
| 6,562,116 B1 * | 5/2003 | Satoh | ........... | 106/31.58 |
| 6,786,956 B1 * | 9/2004 | Ichikawa | ........... | 106/31.43 |

FOREIGN PATENT DOCUMENTS

| | | |
|---|---|---|
| EP | 0 491 993 A | 7/1992 |
| GB | 1 425 509 A | 2/1976 |
| JP | 4-106168 | 4/1992 |
| JP | 5-239397 | 9/1993 |
| JP | 7-102205 | 4/1995 |
| JP | 7-216282 | 8/1995 |
| JP | 8-157765 | 6/1996 |
| JP | 8-267984 | 10/1996 |
| JP | 10-297157 | 11/1998 |
| JP | 11-158421 A | 6/1999 |
| WO | WO 99/61536 A1 * | 12/1999 |

OTHER PUBLICATIONS

Machine Translation of JP 07216282 A (1995).*
Machine Translation of JP 10297157 A (1998).*
Machine Translation of JP 07102205 A (1995).*

* cited by examiner

*Primary Examiner*—Callie Shosho
(74) *Attorney, Agent, or Firm*—Foley & Lardner LLP

(57) ABSTRACT

An oil-based ballpoint pen ink composition comprising a) a colorant, b) a solvent containing one or more solvents having the following chemical structural formula (1)

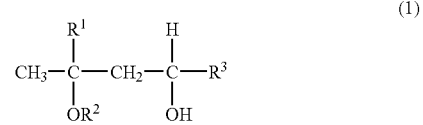

where $R^1$, $R^2$ and $R^3$ are each independently H or $CH_3$, as the main solvent, and c) a resin which is soluble in the solvent, wherein the ink viscosity is 700–8000 meals mPa·s and preferably at least 800 mPa·s and less than 6000 mPa·s at 25° C. According to one mode, the main solvent is a mixed solvent comprising this solvent with propyleneglycol monomethyl ether.

6 Claims, 1 Drawing Sheet

OIL-BASED BALLPOINT PEN INK COMPOSITION AND OIL-BASED BALLPOINT PEN

TECHNICAL FIELD OF THE INVENTION

The present invention relates to an oil-based ballpoint pen ink, and more specifically, it relates to an oil-based ballpoint pen ink with properties including soft and smooth writing feel, rapid permeation of the ink into writing paper surfaces and excellent dryness of pen tips, as well as to an oil-based ballpoint pen employing the ink.

BACKGROUND ART

Conventional oil-based ballpoint pen inks are high viscosity inks with an ink viscosity of 6000–15,000 mPa·s, composed mainly of benzyl alcohol and phenyl cellosolve mixed solvents. However, because of their high viscosity, such oil-based ballpoint pen inks have had a heavy writing feel, such that the ink cannot be smoothly transferred to the page surface without high writing pressure. The written ink residing on the page surface also produces poorly dried drawn lines, or the ink wets and adheres to the pen tip and accumulated ink transfers to the page surface, often smudging the hand. This is known as "ink blotting". As a result of this ink blotting, such inks have not been suitable for use in large-diameter ballpoint pens.

In order to improve the writing feel of ballpoint pens and reduce ink blotting, there have been proposed low viscosity inks with an ink viscosity of 2000–10,000 mPa·s at 20° C. comprising polyvinyl pyrrolidone (molecular weight: 1,000,000 or greater) as the stringy polymer (Japanese Unexamined Patent Publication (Kokai) HEI No. 8-157765 and elsewhere). However, while such low viscosity inks provide a better writing feel, ink blotting still occurs readily and the ink also tends to bleed through PPC paper and the like.

Low viscosity note-writing oil-based ink, used for marking pens, is composed mainly of low aliphatic alcohols and has a viscosity of 3–10 mPa·s. However, such low viscosity ink for marking pens is mainly used for non-adhering surfaces such as plastic, metal or glass, and although it dries quickly, the ink transfer volume is high and the viscosity is low, creating a problem of "color bleed-through" when used for ballpoint pens or on ordinary paper, typically PPC.

Oil-based ballpoint pens are usually loaded with a refill cartridge which has its axial cylinder filled with ink and is fitted in the ball tip at the front end thereof. Most ballpoint pens have the back end exposed to the air.

With refill cartridges thus exposed to the air, the volatile components in the ink evaporate often leading to a change in the composition of the ink, and in the case of inks that have been prepared with a delicate balance of components, it is sometimes impossible to achieve the performance expected for the ink design, particularly with inks comprising low boiling point, highly volatile components.

It is an object of the present invention to provide an oil-based ballpoint pen ink composition which, for oil-based ballpoint pens on both low-absorption surfaces and high-absorption surfaces, exhibits an improved writing feel and accelerated drying of drawn lines, produces low hand smudging, allows writing without bleed-through of the written ink as occurs with conventional felt pens, exhibits excellent ink conserving quality, and can be suitably used even with a large flow volume of ink for note writing, such as in the case of thick-line writing pens, as well as to provide an oil-based ballpoint pen employing the composition.

DISCLOSURE OF THE INVENTION

With the aim of achieving the aforementioned object, it was discovered that the problems described above can be solved by the oil-based ballpoint pen ink composition and oil-based ballpoint pen of the invention which are characterized by the features described below, and the present invention has thus been completed.

(i) An oil-based ballpoint pen ink composition comprising a) a coloring agent, b) a solvent containing one or more solvents having the following chemical structural formula (1)

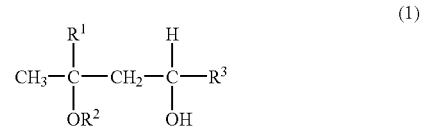

where $R^1$, $R^2$ and $R^3$ are each independently H or $CH_3$, as the main solvent, and c) a resin which is soluble in the solvent, wherein the ink viscosity is 700–8000 mPa·s at 25° C.

(ii) An oil-based ballpoint pen ink composition according to (i) above, which comprises the solvent having chemical structural formula (1) at 50 wt % or greater based on the total solvent.

(iii) An oil-based ballpoint pen ink composition according to (i) above, which contains as main solvents propyleneglycol monomethyl ether together with the solvent having chemical structural formula (1), in a total amount of at least 50 wt % based on the total solvent, wherein the proportion of the solvent having chemical structural formula (1) and the propyleneglycol monomethyl ether is in the range of 1/9 to 9/1 by weight.

(iv) An oil-based ballpoint pen ink composition according to (iii) above, wherein the amount of the solvent having chemical structural formula (1) or the total amount of the solvent having chemical structural formula (1) and the propyleneglycol monomethyl ether is at least 90 wt % based on the total solvent.

(v) An oil-based ballpoint pen ink composition according to any one of (i) to (iv) above, wherein the resin contains either or both polyvinyl butyral and polyvinyl pyrrolidone with a molecular weight of 8000 to 1,500,000.

(vi) An oil-based ballpoint pen ink composition according to any one of (i) to (v) above, wherein the resin is a combination of a resin with a glass transition temperature of 40° C. or higher and a resin with a molecular weight in the range of 8000 to 1,500,000, which are soluble in the solvent, and the resin with a molecular weight of 8000 to 1,500,000 is present at 1–25 wt % with respect to the total ink.

(vii) An oil-based ballpoint pen ink composition according to any one of (i) to (vi) above, wherein the ink viscosity is 800–6000 mPa·s at 25° C.

(viii) An oil-based ballpoint pen comprising an ink holding tube, an oil-based ballpoint pen ink composition according to any one of (i) to (vii) above contained in the ink holding tube and a non-silicone oil based ink follower packed at the back of the ink in the ink holding tube, wherein the permeation loss of the oil-based ballpoint pen ink composition through the ink follower at 50° C. and 30% humidity is no greater than 5%.

(ix) An oil-based ballpoint pen according to (viii) above, wherein the ink holding tube is made of a thermoplastic plastic, and the oil-based ballpoint pen ink composition contains no propyleneglycol monomethyl ether.

BEST MODE FOR CARRYING OUT THE INVENTION

Figure 1:
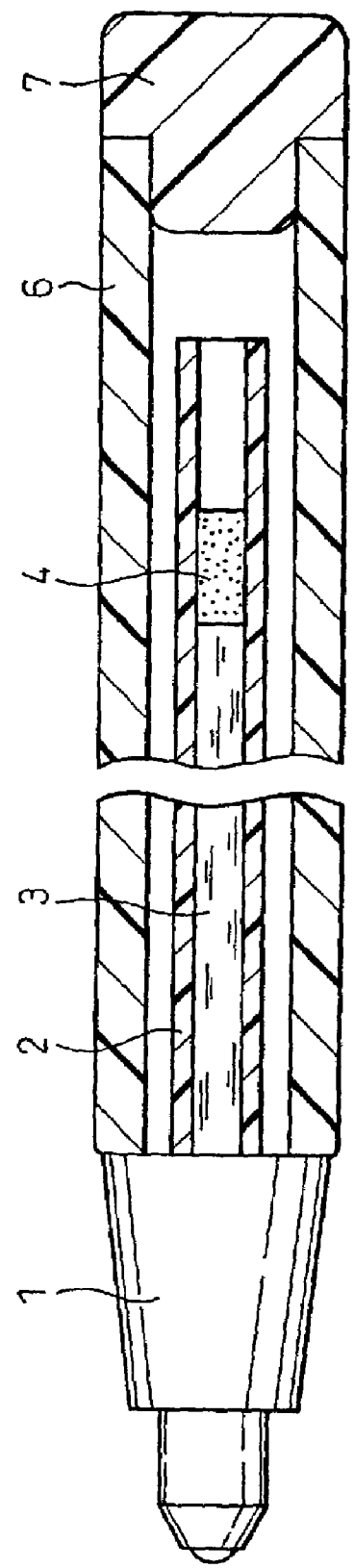
FIG. 1 is a longitudinal cross-sectional view of an oil-based ballpoint pen according to the present invention.

The ink composition of the invention is characterized by containing a compound having the following chemical structural formula (1)

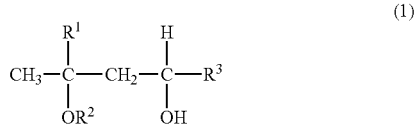

where $R^1$, $R^2$ and $R^3$ are each independently H or $CH_3$, as the main solvent, and specifically one or more from among 3-methoxybutanol, 3-methyl-3-methoxybutanol, 3-methyl-1,3-butanediol, 1,3-butanediol, hexylene glycol and the like. These solvents are of low viscosity (3-methoxybutanol: approximately 3.7 mPa·s (at 20° C.), 3-methyl-3-methoxybutanol: approximately 7.3 mPa·s (at 20° C.), 3-methyl-1,3-butanediol: 253 mpa·s (at 25° C.), 1,3-butanediol: 130.3 mPa·s (at 20° C.), hexylene glycol: 34.4 mPa·s (at 20° C.)), and being characterized by high solubility for the dye and other components used in the ink, they have an effect of increasing the stability of the ink composition of the invention and preventing precipitation and the like, as compared to propyleneglycol monomethyl ether. The solvents are also free of adverse effects on the human body, their vapor pressures are high (3-methoxybutanol: 5 mmHg (at 20° C.), 3-methyl-3-methoxybutanol: 0.5 mmHg (at 20° C.), 3-methyl-1,3-butanediol: 0.01 mmHg, 1,3-butanediol: 0.06 mmHg, hexylene glycol: 0.02 mmHg) to exhibit the desired volatility, and their gas permeability is low for the ink holding tube resin as mentioned above, rendering them useful as the main solvent for the ink composition of the invention. Either or both 3-methoxybutanol or 3-methyl-3-methoxybutanol are particularly preferred.

The compounds with chemical structural formula (1), such as 3-methoxybutanol and 3-methyl-3-methoxybutanol, may be used alone or in mixtures, in which case the mixing ratio may be as desired.

According to one preferred mode of the ink composition of the invention, the solvent represented by chemical structural formula (1) is used at 50 wt % or greater, more preferably 80 wt % or greater and even more preferably 90 wt % or greater, with respect to the total solvent. As mentioned above, these solvents are characterized by having high volatility as well as high solvent power, while their gas permeability for olefin-based resins is also low, and hence they are not only suitable for the object of the invention but also have the advantage of allowing the olefin-based resin ink holding tube to be used without special treatment.

According to another preferred mode of the invention, the ink composition of the invention contains, as the main solvents, a solvent represented by chemical structural formula (1) together with propyleneglycol monomethyl ether as an essential component. Propyleneglycol monomethyl ether has a low viscosity range of around 1–2 mPa·s (at 20° C.) and a highly volatile nature, and thus gives a lighter writing feel for oil-based ballpoint pens and dries rapidly, thus being effective for composing non-blotting ink.

When the ink composition of the invention contains a mixture of a compound having chemical structural formula (1) such as 3-methoxybutanol or 3-methyl-3-methoxybutanol (first main solvent) and propyleneglycol monomethyl ether (second main solvent), the total amount of the mixed solvent may be 50 wt % or greater, preferably 80 wt % or greater and more preferably 90 wt % or greater of the total solvent, and the mixing ratio in terms of weight ratio of the former to the latter may be in the range of 1/9 to 9/1, preferably 3/7 to 9/1 and more preferably in the range of 4/6 to 9/1. When the two solvents are mixed in this proportion, it is possible to simultaneously achieve the aforementioned desired characteristics for the ink composition of the invention while avoiding an unfavorable condition at the pen tip and giving excellent product stability over time even with high density inks. A larger amount of propyleneglycol monomethyl ether is generally preferred to more effectively prevent blotting of accumulated ink at the pen tip.

In the solvent in the ink composition of the invention there may also be included an auxiliary solvent in addition to the main solvent. Preferred auxiliary solvents are those with excellent compatibility with the main solvents and an equivalent or lower vapor pressure than the main solvents.

As specific examples of such auxiliary solvents there may be mentioned alcohols including aliphatic alcohols of 7 or more carbons such as n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, 2-methylcyclohexanol and benzyl alcohol, as well as various other higher alcohols.

As polyhydric alcohols there may be mentioned polyhydric alcohols with 2 or more carbons and 2 or more hydroxyl groups in the molecule, such as ethyleneglycol, diethyleneglycol, triethyleneglycol, dipropyleneglycol, 1,3-propanediol, 1,2-butanediol, 1,3-butanediol, 1,4-butanediol, 2,3-butanediol, 1,5-pentanediol and octyleneglycol.

As monoethers there may be mentioned diethyleneglycol monobutyl ether, dipropyleneglycol monobutyl ether, dipropyleneglycol monopropyl ether, tripropyleneglycol monomethyl ether, tripropyleneglycol monobutyl ether, propyleneglycol butyl ether, propyleneglycol phenyl ether, hexyl ether, 2-ethylhexyl ether, ethyleneglycol monohexyl ether, ethyleneglycol monophenyl ether, ethyleneglycol mono-2-ethylbutyl ether, triethyleneglycol monobutyl ether, tetraethyleneglycol monobutyl ether, tetrapropyleneglycol monobutyl ether.

As additional polyhydric alcohol derivatives there may also be mentioned sorbitan fatty acid-based, polyglycerin higher fatty acid-based, sucrose fatty acid-based and propyleneglycol resin acid-based derivatives.

As esters there may be mentioned a variety of esters including methyl caproate, ethyl caproate, propyl caproate, methyl caprylate, ethyl caprylate, propyl caprylate, methyl laurate, ethyl laurate, methyl oleate, ethyl oleate, capric triglyceride, citric tributylacetate, octyl oxystearate, ethyleneglycol monoricinoleate and propyleneglycol monoricinoleate.

Such auxiliary solvents are preferably added in an amount designed to be less than 40 wt % of the total solvent. This is because, for improved writing feel and paper surface-permeating dryness and to achieve an effect of ink stabilization, etc. for an oil-based ballpoint pen according to the invention, it is preferred for the auxiliary solvent to be used in as low amount as possible. The upper limit is less than 70 wt %, but it is preferably less than 20 wt %, more preferably less than 10 wt % and especially less than 5 wt %.

The amount of the solvent of the invention (here referring to the entire solvent) added will vary depending on the type of solvent used and therefore cannot be specified for all cases, but it will generally be 30–80 wt % and preferably 35–70 wt % with respect to the total ink composition.

If the organic solvent is added at less than 30 wt % the ink flow property is insufficient, and if added at greater than 80 wt % the proportion of the coloring agent, resin and other additives is reduced, producing a major effect on the quality of the product, and therefore neither situation is preferred.

The oil-based ballpoint pen ink composition of the invention is essentially an oil-based ink composition which requires no water, and in fact it will fail to form an ink body if water is added in excess, but since moisture will be absorbed even with anhydrous ink in order to maintain chemical equilibrium, water may be preadded at about 5–10 wt % or less based on the total of the ink composition to ensure stability of the ink.

The oil-based ballpoint pen ink composition of the invention is characterized by using a low viscosity solvent as mentioned above, but another important characteristic thereof is that the viscosity of the ink composition is adjusted within the range of 700–8000 mPa·s. This will ensure low viscosity and high permeability into paper to improve the writing feel for oil-based ballpoint pens, while adjusting the ink viscosity to 700–8000 mPa·s can also eliminate various inconveniences due to bleed-through and solvent pooling on paper with rough fiber quality. It can also avoid the inconveniences brought about by blotting due to wetting of the pen tip with ink, and facilitate use by allowing the ink to be suitably added in relation to the ball diameter. The viscosity is preferably at least 800 mPa·s and less than 6000 mPa·s.

The viscosity of the oil-based ballpoint pen ink composition of the invention may be adjusted using a publicly known viscosity adjustor which is not particularly restricted and may be used in a range which does not adversely affect the ink. Specifically, polyvinyl butyral and polyvinyl pyrrolidone may be suitably used for the invention, as well as cellulose-based resins and the like.

When polyvinyl butyral is used, it may be in the range of 2–15 wt % with respect to the total ink.

A resin which is soluble in the solvent is used in the oil-based ballpoint pen ink composition of the invention. The resin also serves for solid portion adjustment, reduction of pen tip wear and as a color-fixing and binding agent for the coloring material, but it is the major component for ink viscosity adjustment and chafing resistance.

According to one preferred mode, the aforementioned resin is a combination of a low molecular weight resin with a glass transition temperature of 40° C. or higher and preferably 45° C. or higher and a high molecular weight resin with a molecular weight range of 8000 to 1,500,000. The low molecular weight resin contributes to solid portion adjustment, viscosity adjustment, reduction of pen tip wear and improved chafing resistance of written ink, while the high molecular weight resin is used for an effect of increasing the viscosity of the ink and reducing the solid portion. These resins are selected specifically in consideration of their compatibility and their effects on the other components of the ink, but the following examples of resins may be mentioned.

Typical low molecular weight resins with a glass transition temperature of 40° C. or higher include ketone resins, styrene resins, styrene-acryl resins, terpene-based resins including terpene phenol resins, rosin-modified maleic acid resins, rosin phenol resins, alkylphenol resins, phenol-based resins, styrene-maleic acid resins, rosin-based resins, acryl-based resins, urea aldehyde-based resins, maleic acid-based resins and cyclohexanone-based resins. The low molecular weight resin preferably has a molecular weight of 300–20,000 and more preferably 500–20,000.

The low molecular weight resin may be added in an amount of 1–30 wt % and more preferably 1–20 wt %. If added at less than 1 wt % it becomes more difficult to adjust the viscosity and avoid pen tip wear, while at over 30 wt %, the starting materials other than the resin cannot be sufficiently added and an adverse effect is exhibited on the writing feel.

As high molecular weight resins with a molecular weight of 8000–1,500,000 there may be mentioned polyvinyl pyrrolidone, cellulose-based resins, polyvinyl butyral, high molecular weight acryl resins, rosin-modified phenol resins and the like. However, polyvinyl pyrrolidone and especially polyvinyl pyrrolidone with a molecular weight of 5000–70,000 is particularly suitable for the invention.

The high molecular weight resin may be added in an amount of 1–25 wt %, preferably 1–23 wt % and even more preferably 1–20 wt %. If added at less than 1 wt % it becomes more difficult to adjust the viscosity, while at over 25 wt %, the starting materials other than the resin cannot be sufficiently added. The content is preferably 2–15 wt % for polyvinyl pyrrolidone with a molecular weight of 5000–70,000.

When a pigment is used as the colorant or coloring material for the ink composition of the invention, the dispersing agent selected for use may be one capable of dispersing the pigment throughout the resins mentioned above, and it may be of any type, such as an activator or oligomer, so long as the object is achieved. As specific dispersing agents there may be mentioned synthetic resins such as polyvinyl alcohol, polyvinyl pyrrolidone, polyvinyl butyral, polyvinyl ether, styrene-maleic acid copolymers, ketone resins, hydroxyethyl cellulose and its derivatives and styrene-acrylic acid copolymers, or PO•EO addition products, polyester amine-based oligomers, etc.

The colorant used in the oil-based ballpoint pen ink composition of the invention may be a dye or pigment. AS dyes there may be used, as desired, direct dyes, acidic dyes, basic dyes, mordant dyes and acidic mordant dyes, spirit solvent dyes, azoic dyes, sulfur dyes and sulfur vat dyes, vat dyes, disperse dyes, oil-soluble dyes, edible dyes and metal complex salt dyes, which are commonly used in dye ink compositions, or inorganic or organic pigments which are commonly used in pigment ink compositions. The amount added may be selected in the range of 1–50 wt % with respect to the total composition.

The pigment preferably has low solubility in the organic solvent used and preferably has a mean particle size of 30 to 700 nm after dispersion. The amount of pigment to be added may be in the range of 0.5–25 wt % and preferably 0.5–20 wt % with respect to the total ink composition, as necessary.

The pigment used may be a single one or a combination of two or more. If necessary, a dispersing agent or dye employing an inorganic pigment may be added in an amount that does not adversely affect the dispersion stability. There may also be mentioned resin emulsions obtained by polymerization of styrene, acrylic acid, acrylic acid esters, methacrylic acid, methacrylic acid esters, acrylonitrile and olefin-based monomers, hollow resin emulsions which expand in the ink and become amorphous, and organic multicolor pigments composed of colored resin particles obtained by coloring the emulsions themselves with coloring agents.

When the coloring material used for the invention is a pigment, various conventional publicly known methods may be employed to produce a pigment-dispersed ink composition. For example, it may be easily obtained by combining the above-mentioned components and mixing with a stirrer such as a dissolver, or by mixing and pulverization with a ball mill, roll mill, bead mill, sand mill, pin mill or the like followed by centrifugation or filtration to remove the coarse particles, undissolved matter or included solids of the pigment.

According to the invention, a rust preventing agent, mildew-proofing agent, surfactant, lubricant or humectant, which is compatible with and does not adversely affect the ink, may be included if necessary. Fatty acids and the like are particularly suitable for use as humectants. From the standpoint of the product characteristics, a non-volatile solvent or the like which is compatible with the main solvent may also be added within a range that produces no adverse effects, as an additive to inhibit drying.

When the ink composition of the invention is used in a ballpoint pen, the ink follower is preferably inserted at the back end of the ballpoint pen (behind the ink). Because of the high volatility of the main solvent and auxiliary solvent, the ink follower is added to prevent volatilization, moisture absorption and ink wetting. FIG. 1 schematically shows an embodiment of a refill cartridge of an oil-based ballpoint pen according to the invention, where the pen tip 1 including the ballpoint is connected to an ink holding tube 2, ink 3 is held in the ink holding tube 2, and an ink follower 4 is packed in at the back of the ink 3 in the ink holding tube 2. With consumption of the ink 3, i.e. dwindling of the remaining ink 3, the ink follower 4 follows after the ink 3, moving in the ink holding tube toward the pen tip 1. Users may prefer the ink holding tube 2 to be made of a transparent resin to allow the level of ink to be externally visible. According to the invention there are no particular restrictions on the structure of the pen tip 1. This particular type of refill cartridge is integrated with the case 6 and rear cap 7 to form the ballpoint pen.

The ink follower must have low permeation and low diffusion properties for the solvents used in the ink, and as its base there may be used a non-volatile or poorly volatile fluid, and specifically a non-silicone-based oil or fat which is basically incompatible with the organic solvent having chemical structural formula (1), such as polybutene or liquid paraffin. When such substances have low viscosity, a thickening agent or gelling agent may be used. Specifically there may be mentioned metal soaps, bentonites, fatty acid amides, hydrogenated castor oils, metal fine particles containing titanium oxide, silica, alumina, etc. and celluloses.

When the oil-based ballpoint pen ink composition of the invention employs a non-silicone oil-based ink follower, the permeation loss in an atmosphere at 50° C. temperature and 30% humidity may be 5% or lower. More specifically, when 5.5 g of the ink composition is changed in a glass tube (cylindrical tube) with an inner diameter of 8 mmφ as the housing, 1 g of the ink follower is packed, light centrifugation is performed, and the permeation loss is measured after one month under these conditions, the permeation loss may be 3% or lower.

According to the invention, therefore, there is also provided an oil-based ballpoint pen wherein the aforementioned oil-based ballpoint pen ink composition is housed in an ink holding tube and a non-silicone oil-based ink follower is employed, the permeation loss of the oil-based ink composition through the non-silicone oil-based ink follower after one month under the conditions described above being no greater than 3%.

For such non-silicone oil-based ink follower there are used non-drying or semi-drying oils and fats such as liquid paraffin, polybutene, vaseline, spindle oil and the like, but in order to prevent ink inversion, the density difference between the follower and the ink is preferably within 20%, for which purpose additives are added for adjustment of the density as necessary, or appropriate surfactants or the like are included to adjust the wettability with the inner wall of the refill cartridge, thereby achieving the desired following property while consuming any inverted ink.

When the oil-based ballpoint pen according to the invention contains at least 60 wt % of a compound represented by chemical structural formula (1) as the main solvent for the ink composition, the ink permeability is particularly low and an advantage is realized in that a thermoplastic plastic can be used as the ink holding tube.

A thermoplastic plastic used for the invention must be a resin with low swelling for the solvents used, exhibiting a weight or dimensional change of within 5%. That is, it must have the aforementioned solvent resistance for 3-methoxybutanol and 3-methyl-3-methoxybutanol. Suitable thermoplastic plastics for use include polybutylene terephthalate (PBT), polyethylene naphthalate (PEN), polyethylene imide (PEI), polyphenylene sulfide (PPS), aliphatic polyketones, polyethersulfone (PES), polypropylene (pp), polyethylene (PE), polybutene (PB), polymethylpentene, cyclic olefin copolymers, polyarylates (PAR) and some low hygroscopic polyamides. These resins may also be surface-modified or alloyed so long as no adverse effect is produced. Another essential condition is low permeability, in addition to lack of swelling, of the ink holding tube for the solvent. The aforementioned thermoplastic plastics satisfy this condition. As will also be explained under the evaluation method, the permeability is determined by establishing the prescribed setting and measuring the permeation loss after standing for 2 weeks under conditions of 50° C., 30% RH. The permeation loss is preferably no greater than 5%, and more preferably no greater than 3%.

An oil-based ballpoint pen ink composition according to the invention allows control of the ink transfer volume and solves the problem of "color bleed-through" on ordinary paper such as PPC paper, while also eliminating diffusion of the colorant with time and poorly drying of drawn lines caused by pooling of the solvent after writing, since no conventional oil-based ballpoint pen solvents are used. In addition, because of its excellent quick-drying property, it is suitable for use in large-diameter ballpoint pens as well. Through control of "ink blotting" due to adhesion of ink on the pen tip as a result of gradual wetting of the ink on the pen tip and transfer of accumulated ink onto the paper surface, the problem of smudging of the hand, etc. is eliminated, thus avoiding the poor writing feel of conventional high viscosity ink and allowing transfer of ink onto paper surfaces even with low writing pressure. The ink components such as dyes, etc. in the ink composition of the invention also have excellent solubility and the gas permeability for resin ink holding tubes is low, to thus provide an ink with excellent stability over time.

The reason for these effects is that using a compound having chemical structural formula (1), such as 3-methoxybutanol or 3-methoxy-3-methylbutanol as the main solvent, which has lower viscosity than solvents conventionally used for oil-based ballpoint pens, is volatile, and comprises ink starting material components with high solubility, while also using as part of the main solvent propyleneglycol monomethyl ether, which has hitherto been used in marking pens and has a viscosity range of 2–10 mPa·s, can provide exceedingly high stability over time even with a high solid content. Furthermore, by adjusting the viscosity of the ink within the range of 800–6000 mPa·s, it is possible to eliminate several inconveniences resulting from color bleed-through or solvent pooling on ordinary paper of rough fiber quality, and the inconveniences that accompany ink blotting produced by ink wetting of the pen tip can be controlled. In addition, it is possible to provide an oil-based ballpoint pen ink composition that can give a light writing feel and minimize pen tip wear depending on the mixing proportion of the resins and their viscosity ranges, when two or more different resins are used. The low solvent permeation even for thermoplastic plastics and especially olefin-based resins despite the relatively high vapor pressure, when a compound having chemical structural formula (1) is used as the main solvent, is attributed to the fact that the vapor pressure of the solvent is not too high, as well as to a relatively high steric hindrance and solvent hydrogen bonding force arising from the chemical structural nature of the solvent, which reduce the affinity for low polar substances such as olefins and results in lower permeation.

EXAMPLES

The present invention will now be explained in greater detail by way of the following examples which are not, however, intended to restrict the invention.

| (Example 1) Viscosity: 3880 mPa · s | |
|---|---|
| VALIFAST BLACK #3830 (Orient Chemical Industries, Ltd.) | 20.0% |
| Polyvinylbutyral BM-1 (Sekisui Chemical Co., Ltd.) | 10.0% |
| 3-methoxy-3-methylbutanol | 70.0% |
| (Example 2) viscosity: 3000 mPa · s | |
| VALIFAST BLACK #3830 (Orient Chemical Industries, Ltd.) | 20.0% |
| Polyvinylbutyral BM-1 (Sekisui Chemical Co., Ltd.) | 5.7% |
| HIRAK 110H (Hitachi Chemical Co., Ltd.) | 12.0% |
| 3-methoxy-3-methylbutanol | 62.3% |
| (Example 3) Viscosity: 1730 mPa · s | |
| VALIFAST BLACK #3830 (Orient Chemical Industries, Ltd.) | 20.0% |
| Polyvinylbutyral BL-1 (Sekisui Chemical Co., Ltd.) | 12.0% |
| 3-methoxy-3-methylbutanol | 68.0% |
| (Example 4) Viscosity: 4350 mPa · s | |
| VALIFAST BLACK #3830 (Orient Chemical Industries, Ltd. | 20.0% |
| Polyvinylbutyral BM-1 (Sekisui Chemical Co., Ltd.) | 6.7% |
| HIRAK 110H (Hitachi Chemical Co., Ltd.) | 9.5% |
| Neutralized oleic acid | 4.0% |
| 3-methoxy-3-methylbutanol | 59.8% |
| (Example 5) Viscosity: 5960 mPa · s | |
| VALIFAST BLACK #3830 (Orient Chemical Industries, Ltd.) | 20.0% |
| Polyvinylbutyral BM-1 (Sekisui Chemical Co., Ltd.) | 7.7% |
| Bekkasite 1111 (Dainippon Ink and Chemicals, Incorporated.) | 9.5% |
| Neutralized oleic acid | 4.0% |
| 3-methoxy-3-methylbutanol | 58.8% |
| (Example 6) Viscosity: 2920 mPa · s | |
| VALIFAST BLACK #3830 (Orient Chemical Industries, Ltd.) | 20.0% |
| Polyvinylbutyral BM-1 (Sekisui Chemical Co., Ltd.) | 3.0% |
| MALKYD No.5 (Arakawa Chemical Co.) | 16.0% |
| Neutralized oleic acid | 4.0% |
| Hexaglycerin monooleate | 5.0% |
| 3-methoxy-3-methylbutanol | 52.0% |
| (Example 7) Viscosity: 1100 mPa · s | |
| SUPIRON BLACK GMH SPECIAL (Hodogaya Chemical Industries) | 8.0% |
| VALIFAST VIOLET #1702 (Orient Chemical Industries, Ltd.) | 20.0% |
| SUPIRON YELLOW C-GNH (Hodogaya Chemical Industries) | 5.0% |
| Polyvinylbutyral BM-1 (Sekisui Chemical Co., Ltd.) | 6.0% |
| YS Polyster T-130 (Yasuhara Chemical Co., Ltd.) | 4.0% |
| 3-methoxy-butanol | 57.0% |
| (Example 8) Viscosity: 1970 mPa · s | |
| SUPIRON BLACK GMH SPECIAL (Hodogaya Chemical Industries) | 8.0% |
| VALIFAST VIOLET #1702 (Orient Chemical Industries, Ltd.) | 20.0% |
| SUPIRON YELLOW C-GNH (Hodogaya Chemical Industries) | 5.0% |
| Polyvinylbutyral BM-1 (Sekisui Chemical Co., Ltd.) | 6.0% |
| YS Polyster T-130 (Yasuhara Chemical Co., Ltd.) | 4.0% |
| 3-methoxy-butanol | 22.8% |
| 3-methoxy-3-methylbutanol | 34.2% |
| (Example 9) Viscosity: 1200 mPa · s | |
| SUPIRON BLACK GMH SPECIAL (Hodogaya Chemical Industries) | 8.0% |
| VALIFAST VIOLET #1702 (Orient Chemical Industries, Ltd.) | 20.0% |
| SUPIRON YELLOW C-GNH (Hodogaya Chemical Industries) | 5.0% |
| Polyvinyl pyrrolidone PVP-K30 (ISP) → Molecular weight: 45,000–55,000 | 8.0% |
| YS Polyster YP-90L (Yasuhara Chemical Co., Ltd.) | 8.0% |
| 3-methoxy-butanol | 31.0% |
| 3-methoxy-3-methylbutanol | 20.0% |
| (Comp. Ex. 1) Using solvent outside of scope of claims/Viscosity: 6600 mPa · s 0.125 | |
| VALIFAST BLACK #3830 (Orient Chemical Industries, Ltd.) | 20% |
| Polyvinylbutyral BM-S (Sekisui Chemical Co., Ltd.) | 10% |
| Diethyleneglycol monobutyl ether | 40% |
| 3-methoxy-3-methylbutanol | 30% |
| (Comp. Ex. 2): Using solvent with higher vapor pressure than main solvent/Viscosity: 4530 mPa · s | |
| SUPIRON BLACK GMH SPECIAL (Hodogaya Chemical Industries) | 5% |
| VALIFAST VIOLET #1702 (Orient Chemical Industries, Ltd.) | 10% |
| SUPIRON YELLOW C-GNH (Hodogaya Chemical Industries) | 5% |
| Polyvinylbutyral BM-1 (Sekisui Chemical Co., Ltd.) | 8% |
| MALKYD No.34 (Arakawa Chemical Industries Ltd.) | 17.0% |
| Propyleneglycol monomethyl ether | 10% |
| Ethanol | |
| Dipropyleneglycol dimethyl ether | 14% |

-continued

| | |
|---|---|
| Neutralized oleic acid | 2% |
| Castor oil derivative | 3% |
| (Comp. Ex. 3) Using resin insoluble in solvent used | |
| VALIFAST BLACK #3830 (Orient Chemical Industries, Ltd.) | 28% |
| Polyvinylbutyral BM-S (Sekisui Chemical Co., Ltd.) | 8% |
| BR-50 (Mitsubishi Rayon Co., Ltd.) | 12% |
| Propyleneglycol monomethyl ether | 22% |
| 3-methoxy-butanol | 30% |
| (Comp. Ex. 4): Ink viscosity of less than 700/Viscosity: 650 mPa · s | |
| SUPIRON BLACK GMH SPECIAL (Hodogaya Chemical Industries) | 10% |
| VALIFAST BLACK #1702 (Orient Chemical Industries, Ltd.) | 20% |
| Polyvinyl pyrrolidone K-30 (BASF) | 5% |
| MALKYD No.34 (Arakawa Chemical Industries, Ltd.) | 5% |
| 3-methoxy-butanol | 43% |
| 3-methoxy-3-methylbutanol | 17% |
| (Comp. Ex. 5): With ink viscosity of greater than 7000/Viscosity: 9800 mPa · s | |
| VALIFAST BLACK #3830 (Orient Chemical Industries, Ltd.) | 30.0% |
| Polyvinylbutyral BM-S (Sekisui Chemical Co., Ltd.) | 9.5% |
| 3-methoxy-3-methylbutanol | 60.5% |
| (Comp. Ex. 6): Without resin portion of 1–25%/ viscosity unmeasurable | |
| VALIFAST BLACK #3830 (Orient Chemical Industries, Ltd.) | 15% |
| VALIFAST VIOLET #1702 (Orient Chemical Industries, Ltd.) | 12% |
| Polyvinylbutyral BM-S (Sekisui Chemical Co., Ltd.) | 30% |
| YP 90L (Yasuhara Chemical Co., Ltd.) | 8% |
| 3-methoxy-butanol | 20% |
| 3-methoxy-3-methylbutanol | 15% |
| (Comp. Ex. 7): Tg outside of range/Viscosity: 2800 mPa · s | |
| VALIFAST BLACK #3830 (Orient Chemical Industries, Ltd.) | 12% |
| VALIFAST VIOLET #1702 (Orient Chemical Industries, Ltd.) | 18% |
| Polyvinyl pyrrolidone K-30 (BASF) | 13% |
| BR-117 (Tg: 35° C.) (Mitsubishi Rayon Co., Ltd.) | 2% |
| 3-methoxy-butanol | 25% |
| 3-methoxy-3-methylbutanol | 27% |
| Propyleneglycol monomethyl ether | 3% |
| (Example 11) Viscosity: 990 mPa · s | |
| VALIFAST BLACK #3830 (Orient Chemical Industries, Ltd.) | 8% |
| VALIFAST BLACK #1702 (Orient Chemical Industries, Ltd.) | 20% |
| SUPIRON YELLOW C-GNH (Hodogaya Chemical Industries) | 5% |
| Polyvinylbutyral BM-1 (Sekisui Chemical Co., Ltd.) | 4% |
| YP90L (Tg: 63° C.) (Yasuhara Chemical Co., Ltd.) | 4% |
| Propyleneglycol monomethyl ether | 20% |
| Hexyleneglycol | 10% |
| 3-methoxy-butanol | 24% |
| 3-methoxy-3-methylbutanol | 5% |
| (Example 12) Viscosity: 2100 mPa · s | |
| SUPIRON BLACK GMH SPECIAL (Hodogaya Chemical Industries) | 13% |
| VALIFAST BLACK #1702 (Orient Chemical Industries, Ltd.) | 22% |
| Polyvinyl pyrrolidone K-30 (BASF) | 10% |
| YP 90L (Yasuhara Chemical Co., Ltd.) | 3% |
| Propyleneglycol monomethyl ether | 10% |
| 3-methoxy-butanol | 22% |
| 3-methoxy-3-methylbutanol | 15% |
| 3-methyl-1,3-butanediol | 5% |
| (Example 13) Viscosity: 850 mPa · s | |
| VALIFAST VIOLET #3830 (Orient Chemical Industries, Ltd.) | 8% |
| VALIFAST VIOLET #1702 (Orient Chemical Industries, Ltd.) | 20% |
| SUPIRON YELLOW C-GNH (Hodogaya Chemical Industries) | 5% |
| Hydroxypropylcellulose SSL (Nippon Soda Co., Ltd.) | 8% |
| Polyvinyl pyrrolidone K-80 (BASF) | 1% |
| MALKYD No.34 (Tg: 72–73° C.) (Arakawa Chemical Industries, Ltd.) | 4% |
| Propyleneglycol monomethyl ether | 19% |
| 3-methoxy-butanol | 20% |
| 3-methoxy-3-methylbutanol | 15% |
| (Example 14) Viscosity: 2800 mPa · s | |
| SUPIRON BLACK GMH SPECIAL (Hodogaya Chemical Industries) | 10% |
| VALIFAST BLACK #1702 (Orient Chemical Industries, Ltd.) | 23% |
| Polyvinyl pyrrolidone K-30 (BASF) | 10% |
| MALKYD No.5 (Tg: 72–73° C.) (Arakawa Chemical Industries, Ltd.) | 7% |
| Propyleneglycol monomethyl ether | 15% |
| 3-methoxy-butanol | 20% |
| 3-methoxy-3-methylbutanol | 15% |
| (Comp. Ex. 8): Using solvent outside of scope of claims/Viscosity: 950 mPa · s | |
| VALIFAST VIOLET #3830 (Orient Chemical Industries, Ltd.) | 5% |
| VALIFAST VIOLET #1702 (Orient Chemical Industries, Ltd.) | 10% |
| SUPIRON YELLOW C-GNH (Hodogaya Chemical Industries) | 5% |
| Polyvinylbutyral BM-1 (Sekisui Chemical Co., Ltd.) | 3% |
| MALKYD No.34 (Arakawa Chemical Industries, Ltd.) | 16.6% |
| Polyvinyl pyrrolidone K-90 (ISP) | 0.4% |
| Propyleneglycol monomethyl ether | 43% |
| Higher alcohol (carbon number: 10–15) | 10% |
| Neutralized oleic acid | 4% |
| Castor oil derivative | 3% |
| (Comp. Ex. 9): Ink viscosity of less than 700 mPa · s/Viscosity: 560 mPa · s | |
| SUPIRON BLACK GMH SPECIAL (Hodogaya Chemical Industries) | 10% |
| VALIFAST BLACK #1702 (Orient Chemical Industries, Ltd.) | 23% |
| Polyvinyl pyrrolidone K-30 (BASF) | 7% |
| MALKYD No.34 (Arakawa Chemical Industries, Ltd.) | 5% |
| Propyleneglycol monomethyl ether | 20% |
| 3-methoxy-butanol | 20% |
| 3-methoxy-3-methylbutanol | 15% |
| (Comp. Ex. 10): Ink viscosity of greater than 6000 mPa · s/Viscosity: 6300 mPa · s | |
| SUPIRON BLACK GMH SPECIAL (Hodogaya Chemical Industries) | 10% |
| SUPIRON YELLOW C-GNH (Hodogaya Chemical Industries) | 5% |
| VALIFAST VIOLET #1702 (Orient Chemical Industries, Ltd.) | 20% |
| MALKYD No.34 (Arakawa Chemical Industries, Ltd.) | 4% |
| Polyvinyl pyrrolidone K-80 (ISP) | 8% |
| Propyleneglycol monomethyl ether | 18% |
| 3-methoxy-butanol | 20% |
| 3-methoxy-3-methylbutanol | 15% |

-continued

| (Comp. Ex. 14): Tg outside of range/Viscosity: 2500 mPa · s | |
|---|---|
| VALIFAST BLACK #3830 (Orient Chemical Industries, Ltd.) | 12% |
| VALIFAST VIOLET #1702 (Orient Chemical Industries, Ltd.) | 18% |
| Polyvinyl pyrrolidone K-30 (Sekisui Chemical Co., Ltd.) | 13% |
| BR-117 (Tg: 35° C.) (Mitsubishi Rayon Co., Ltd.) | 2% |
| Propyleneglycol monomethyl ether | 10% |
| 3-methoxy-butanol | 25% |
| 3-methoxy-3-methylbutanol | 20% |

Inks were obtained with the compositions listed above, using a dispersion stirrer. The inks were then subjected to the following evaluation test.

The ballpoint pens used for the test each had a polypropylene tube with an inner diameter of 1.60 mm and a stainless steel tip (the ball was a superhard alloy or a metal carbide with a diameter of 1.4 mm). The ballpoint pens were filled with the inks obtained for the examples and comparative examples, and then subjected to the following test.

1) Viscosity: Measured at 25° C. using a Type-E rotational viscometer.

2) Drawn line drying: Immediately after freehand (circle) drawing on PPC paper, the drawn line was rubbed with a tissue. Samples with no colorant loss were indicated by ○, those with some loss were indicated by Δ and those with considerable loss were indicated by X.

3) Anti-blotting: After filling the ballpoint pen with the prescribed ink and writing with a mechanical writing tester at a speed of 4.5 m/min, an angle of 60° and a load of 200 g, the amount of ink adhering to the tip holder was observed. Samples with virtually no adhesion were indicated by ⊚, those with slight adhesion were indicated by ○, those with significant adhesion were indicated by Δ and those with considerable adhesion were indicated by X.

4) Bleed-through of written lines: The back side of freehand (circle) drawn PPC paper was visually observed after one day. Samples with no color bleed-through were indicated by ○, those with some color bleed-through were indicated by Δ and those with considerable bleed-through were indicated by X.

5) Writing feel: A relative comparison was made by response based on the writing feel when writing freehand with a ballpoint pen filled with the prescribed ink. A very light writing feel was indicated by ⊚, a light writing feel was indicated by ○, a slightly heavy writing feel was indicated by Δ and a heavy writing feel was indicated by X.

6) Pen tip drying: After freehand (circle) drawing on PPC paper, the written lines were allowed to stand for one hour and the degree of initial "smearing" was evaluated on the following scale: resistant to smearing—○, susceptible to smearing—X.

7) Permeability through thermoplastic plastic (polypropylene tube) under high temperature environment: Using a polypropylene tube as the plastic to seal the ink solvent, it was then allowed to stand for 2 weeks under conditions of 50° C., 30% RH and the loss was measured.

The sealing was accomplished by using one end of the tube as the bottom and pressing a metal column in the bottom of the tube. An ink follower (liquid paraffin in this case) was packed in from the other end of the tube as the top. After packing in the ink follower, light centrifugation was performed to minimize inclusion of air bubbles. The pen was set with the pen tip pointing downward.

8) Chafing (fastness): After freehand (circle) drawing on coated paper, the drawn line was rubbed with a tissue. Samples with no colorant loss were indicated by ○, those with some loss were indicated by Δ and those with considerable loss were indicated by X.

9) Drawn line stability (drawn line dispersion): The degree of drawn line ink scattering was observed upon freehand (circle) drawing on straw paper. Samples with virtually no scattering were indicated by ⊚, those with slight scattering were indicated by ○, those with significant scattering were indicated by Δ and those with considerable scattering were indicated by X.

10) Long-term ink stability: A glass bottle containing ink was stored for one month in a thermostatic layer set to a temperature of 0° C. and 50° C. for 12 hours each, and then the presence of precipitation at the bottom of the glass bottle was determined. Samples without precipitation were indicated by ○, those with a little precipitation were indicated by Δ and those with considerable precipitation were indicated by X.

11) Shelf-life based on ink solvent permeation (Permeability through ink following material): The shelf-life percentages are listed in Table 2. After placing 5.5 g of ink in an 8φ inner diameter glass tube (cylindrical), 1 g of ink follower was packed in, light centrifugation was performed and then permeation loss of ink per month was measured under conditions of 50° C., 30% RH.

The ink follower (volatilization preventer) used was liquid paraffin (Fresia w90 by Idemitsu Kosan Co., Ltd.).

TABLE 1

| | Example | | | | | | | | | Comp. Ex. | | | | | | |
|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 |
| Viscosity/mPa · s | 3880 | 3000 | 1730 | 4350 | 5960 | 2920 | 1100 | 1970 | 1200 | 6600 | 4530 | — | 650 | 9800 | — | 2800 |
| Drawn line drying | ○ | ○ | ○ | ○ | ○ | ○ | ○ | ○ | ○ | Δ | ○ | — | X | Δ | — | Δ |
| Anti-blotting | ⊚ | ○ | ○ | ⊚ | ⊚ | ○ | ○ | ○ | ○ | Δ | ⊚ | — | X | ⊚ | — | ○ |
| Written line bleed-through | ○ | ○ | ○ | ○ | ○ | ○ | ○ | ○ | ○ | ○ | ○ | — | Δ | ○ | — | ○ |
| Writing feel | ⊚ | ⊚ | ⊚ | ⊚ | ⊚ | ⊚ | ⊚ | ⊚ | ⊚ | ⊚ | ○ | — | ⊚ | Δ | — | ⊚ |
| Pen tip drying | ○ | ○ | ○ | ○ | ○ | ○ | ○ | ○ | ○ | ○ | Δ | — | ○ | Δ | — | ○ |
| Plastic permeability | ≦3% | ≦3% | ≦3% | ≦3% | ≦3% | ≦3% | ≦3% | ≦3% | ≦3% | ≦3% | ≦3% | ≧5% | ≦3% | ≦3% | — | ≦3% |
| Chafing (fastness) | ○ | ○ | ○ | ○ | ○ | ○ | ○ | ○ | ○ | Δ | ○ | — | ○ | ○ | — | X |

Note: Comparative Examples 3 and 6 could not be prepared as inks.

TABLE 2

|  | Example | | | | Comp. Ex. | | | |
| --- | --- | --- | --- | --- | --- | --- | --- | --- |
|  | 11 | 12 | 13 | 14 | 11 | 12 | 13 | 14 |
| Viscosity/mPa·s | 990 | 2100 | 850 | 2800 | 950 | 560 | 6300 | 2500 |
| Drawn line drying | ○ | ○ | ○ | ○ | ○ | Δ | Δ | ○ |
| Anti-blotting | ⊙ | ⊙ | ⊙ | ⊙ | ⊙ | Δ | ○ | Δ |
| Written line bleed-through | ○ | ○ | ○ | ○ | ○ | ○ | ○ | ○ |
| Writing feel | ⊙ | ⊙ | ⊙ | ⊙ | ○ | ⊙ | Δ | ○ |
| Pen tip drying | ○ | ○ | ○ | ○ | Δ | ○ | ○ | ○ |
| Drawn line stability | ⊙ | ⊙ | ⊙ | ⊙ | ○ | ○ | X | ○ |
| Long-term ink stability | ○ | ○ | ○ | ○ | Δ | ○ | ○ | Δ |
| Shelf-life/Permeation loss (%/month) | ≦5% | ≦5% | ≦5% | ≦5% | ≧15% | ≦5% | ≦5% | ≦5% |
| Chafing | ○ | ○ | ○ | ○ | ○ | Δ | Δ | X |

As clearly shown by the above results, the ink compositions of the examples which were in the range of the invention were demonstrated to be highly superior to the ink compositions of the comparative examples which were outside of the range of the invention, in terms of ink flow property, solid stability over time, dissolution stability of dye coloring agents over time, dispersion stability of pigment coloring agents over time, ballpoint pen performance, and ink stability over time based on permeation through ink holding tubes.

INDUSTRIAL APPLICABILITY

According to the present invention there is provided an oil-based ballpoint pen ink composition which eliminates pooling of ink on paper surfaces, reduces hand smudging, improves writing feel and allows writing without bleed-through of written lines as occurs with conventional felt pens, thus providing performance for oil-based ballpoint pens on low-absorption surfaces and high-absorption surfaces which has not been realizable with conventional oil-based ballpoint pens. There is further provided an oil-based ballpoint pen which can reduce permeation of ink solvents even when using commonly used ordinary plastic tubes.

The invention claimed is:

1. An oil-based ink ballpoint pen comprising an ink holding tube, a ballpoint tip provided at an end of said holding tube and an ink follower packed at the back of the ink composition in said ink holding tube for preventing evaporation of the ink from the holding tube, said ink composition comprising a) a colorant; b) two or more main solvents, wherein a first main solvent is 3-methoxy-3-methylbutanol or 3-methoxybutanol and a second main solvent is propyleneglycol monomethyl ether, the first main solvent and the second main solvent together comprise at least 50% of the total weight of all solvents; and c) a resin soluble in said solvents; wherein a proportion of said first main solvents and said second main solvent is in the range of 1/9 to 9/1 by weight, and the ink viscosity is 700–8000 mPa·s at 25° C.

2. The pen of claim 1, wherein said first main solvent and said second main solvent comprise together at least 90% of the total weight of all the solvents.

3. An oil-based ink ballpoint pen comprising an ink holding tube, an oil-based ballpoint pen ink composition contained in the ink holding tube and a non-silicone oil based ink follower packed at the back of the ink in the ink holding tube, wherein said ink composition comprising a) a colorant, b) one or more main solvents selected from the group consisting of 3-methyl-3-methoxybutanol and 3-methoxybutanol, wherein said main solvents comprise 50 wt % or greater of the total weight of all solvents, and c) a resin which is soluble in said solvent, wherein the ink viscosity is 700–8000 mPa·s at 25° C., and wherein the permeation loss of said oil-based ballpoint pen ink composition through said ink follower at 50° C. and 30% humidity is no greater than 5%.

4. The pen according to claim 3, wherein said ink holding tube is made of a thermoplastic plastic, and said oil-based ballpoint pen ink composition contains no propyleneglycol monomethyl ether.

5. The pen according to claim 3, wherein the ink viscosity of the oil-based ink ballpoint pen composition is 800–6000 mPa·s at 25° C.

6. The pen of claim 3, wherein the main solvent comprises at least 80% of the total weight of all the solvents.

* * * * *